US012605779B2

(12) United States Patent
Kuehn

(10) Patent No.: US 12,605,779 B2
(45) Date of Patent: Apr. 21, 2026

(54) SAW BLADE GUIDING DEVICE FOR A SAW, AND SAW HAVING THE SAW BLADE GUIDING DEVICE

(71) Applicant: Robert Bosch GmbH, Stuttgart (DE)

(72) Inventor: Thorsten Kuehn, Eislingen (DE)

(73) Assignee: Robert Bosch GmbH, Stuttgart (DE)

( * ) Notice: Subject to any disclaimer, the term of this patent is extended or adjusted under 35 U.S.C. 154(b) by 238 days.

(21) Appl. No.: 18/693,703

(22) PCT Filed: Sep. 7, 2022

(86) PCT No.: PCT/EP2022/074789
§ 371 (c)(1),
(2) Date: Mar. 20, 2024

(87) PCT Pub. No.: WO2023/046468
PCT Pub. Date: Mar. 30, 2023

(65) Prior Publication Data
US 2024/0316660 A1     Sep. 26, 2024

(30) Foreign Application Priority Data
Sep. 23, 2021    (DE) ..................... 10 2021 210 575.0

(51) Int. Cl.
*B23D 51/02*        (2006.01)
*B23D 49/00*        (2006.01)
(52) U.S. Cl.
CPC ......... *B23D 51/027* (2024.05); *B23D 49/007* (2013.01)
(58) Field of Classification Search
CPC .............................. B23D 51/025; B23D 49/10
See application file for complete search history.

(56) References Cited

U.S. PATENT DOCUMENTS

| | | | | | |
|---|---|---|---|---|---|
| 930,228 | A | * | 8/1909 | Rennie ................. | B23D 47/005 83/828 |
| 2,609,016 | A | * | 9/1952 | Bush .................... | B23D 51/025 29/76.1 |
| 2,782,811 | A | * | 2/1957 | Johnson ............... | B23D 51/025 83/820 |

(Continued)

FOREIGN PATENT DOCUMENTS

| | | |
|---|---|---|
| DE | 43 20 233 C1 | 6/1994 |
| DE | 10 2004 045 539 A1 | 3/2006 |

OTHER PUBLICATIONS

International Search Report corresponding to PCT Application No. PCT/EP2022/074789, mailed Dec. 14, 2022. (German and English language document). (5 pages).

*Primary Examiner* — Sean M Michalski
(74) *Attorney, Agent, or Firm* — Maginot, Moore & Beck LLP

(57)        ABSTRACT

A saw blade guiding device for a saw, in particular a jig saw, includes at least one guide unit for guiding a saw blade of the saw in a sawing operation. The guide unit has two guide elements, which are provided to together form a guide holder for the saw blade, wherein a width of the guide holder is adjustable by the two guide elements. At least one guide element of the two guide elements has, on a side facing the other guide element, at least two guide faces, each of which is provided to form a side face of the guide holder. The at least two guide faces are offset with respect to one another at least substantially parallel to an extent of the width the guide holder.

14 Claims, 7 Drawing Sheets

(56)  References Cited

U.S. PATENT DOCUMENTS

| | | | | |
|---|---|---|---|---|
| 2,866,485 | A * | 12/1958 | Anton | B23D 49/162 |
| | | | | 83/628 |
| 4,033,319 | A * | 7/1977 | Winter | B23D 47/005 |
| | | | | 83/828 |
| 4,189,968 | A * | 2/1980 | Miranti, Jr. | B23D 61/126 |
| | | | | 83/820 |
| 4,628,605 | A * | 12/1986 | Clowers | B23D 49/165 |
| | | | | 30/393 |
| 4,665,617 | A * | 5/1987 | Maier | B23D 49/162 |
| | | | | 30/392 |
| 4,837,935 | A * | 6/1989 | Maier | B23D 49/167 |
| | | | | 30/392 |
| 5,644,847 | A * | 7/1997 | Odendahl | B23D 51/025 |
| | | | | 30/392 |
| 6,920,694 | B2 * | 7/2005 | Hecht | B23D 51/025 |
| | | | | 30/392 |
| 7,451,546 | B2 * | 11/2008 | Delfini | B23D 51/025 |
| | | | | 30/392 |
| 2002/0032968 | A1 * | 3/2002 | Takahashi | B23D 51/16 |
| | | | | 30/392 |
| 2003/0024127 | A1 * | 2/2003 | Hawketts | B23Q 13/00 |
| | | | | 30/373 |
| 2003/0033923 | A1 * | 2/2003 | Chen | B27B 21/04 |
| | | | | 83/581 |
| 2010/0050443 | A1 * | 3/2010 | Casota | B23D 51/025 |
| | | | | 30/289 |
| 2011/0185582 | A1 * | 8/2011 | Koeder | B23D 49/165 |
| | | | | 83/835 |
| 2011/0308369 | A1 * | 12/2011 | Koeder | B23D 51/025 |
| | | | | 356/615 |

* cited by examiner

SAW BLADE GUIDING DEVICE FOR A SAW, AND SAW HAVING THE SAW BLADE GUIDING DEVICE

This application is a 35 U.S.C. § 371 National Stage Application of PCT/EP2022/074789, filed on Sep. 7, 2022, which claims the benefit of priority to Serial No. DE 10 2021 210 575.0, filed on Sep. 23, 2021 in Germany, the disclosures of which are incorporated herein by reference in their entirety.

BACKGROUND

A saw blade guiding device for a saw, comprising at least one guide unit for guiding a saw blade of the saw in a sawing operation, has already been proposed whereby the guide unit comprises two guide elements which are provided to together form a guide holder for the saw blade, whereby a width of the guide holder can be adjusted via the two guide elements.

SUMMARY

The disclosure relates to a saw blade guiding device for a saw, in particular a jig saw, comprising at least one guide unit for guiding a saw blade of the saw in a sawing operation, whereby the guide unit comprises two guide elements which are provided to together form a guide holder for the saw blade, in particular an untoothed saw blade back, whereby a width of the guide holder is adjustable via the two guide elements.

It is proposed that at least one guide element of the two guide elements has, on a side facing the other guide element of the two guide elements, at least two guide faces, each of which is provided to form a side face of the guide holder, in particular depending on a guiding position of the guide element, the at least two guide faces of the guide element being arranged offset with respect to one another at least substantially parallel to an extent of the width of the guide holder.

In particular, the at least two guide faces are designed displaced with respect to one another in an offset direction. The term "substantially parallel" is in particular understood to mean an orientation of a straight line, a plane or a direction, in particular an offset direction in which the at least two guide faces are designed displaced with respect to one another, relative to another straight line, another plane or a reference direction, in particular a straight line which includes the width of the guide holder, whereby the straight line, the plane or the direction features a deviation of less than 8°, advantageously less than 5° and particularly advantageously less than 2°, relative to the other straight line, the other plane or the reference direction, in particular viewed in at least one projection plane, the deviation preferably caused by manufacturing imprecision. Preferably, the guide holder is delimited by at least two side faces which are in particular each designed to be at least substantially perpendicular to the offset direction and/or to the extent of the width of the guide holder. The expression "substantially perpendicular" is intended in particular to mean an orientation of a straight line, a plane or a direction, in particular of a main extension plane of one of the side faces, relative to another straight line, another plane or a reference direction, in particular the offset direction and/or a straight line which includes the width of the guide holder, whereby the straight line, the plane or the direction, and the other straight line, the other plane, or the reference direction, make an angle of 90° with a deviation of less than 8°, advantageously less than 5° and particularly advantageously less than 2°, in particular viewed in a projection plane, the deviation preferably caused by manufacturing imprecision. In particular, the guide element forms a respective side face of the guide holder via each one of the guide faces. Preferably, the other guide element forms another side face of the guide holder. Preferably, when viewed perpendicular to the guide faces, the guide faces are arranged at a distance from each other on the guide element. The guide faces are preferably at least substantially planar at least in regions. Preferably, the guide faces are designed at least in part at least substantially perpendicular to the offset direction and/or to the extent the width of the guide holder. Preferably, the width of the guide holder corresponds to a minimum spacing of the side faces of the guide holder. The side faces and/or the guide faces each have a main extension plane which, in particular, extends at least substantially perpendicular to the offset direction and/or to the extent of the width of the guide holder. The expression "main extension plane" of a structural unit is in particular intended to mean a plane which is parallel to a largest side face of a smallest notional cuboid which just completely encloses the structural unit, and which in particular runs through the center of the cuboid. Preferably, each of the guide faces of the guide element has a minimum spacing to the other guide element which is different from each of the other guide faces, in particular in each guiding position. Preferably, the guide element, in particular the guide faces, are designed such that a maximum width of the guide holder is at most 4 mm, preferably at most 3 mm, and more preferably at most 2 mm.

The saw blade guiding device is provided in particular for guiding the saw blade of the saw in a sawing operation. In particular, the side faces of the guide holder are provided to sit at least partially flat against the saw blade in at least one operating state in order to prevent the saw blade from deflecting outward. Preferably, the guide holder comprises a central plane extending perpendicular to the width of the guide holder. In particular, the guide holder is designed such that a point on the side face comprising one of the respective guide faces of the guide holder, in particular one of the two side faces of the guide holder, said point being nearest to the central plane when in a guiding position, lies within a planar surface which is oriented parallel to the central plane. Preferably, the guide holder features a U-shaped basic shape. In particular, the basic shape of the guide holder is designed to be different from a V-shaped embodiment. Particularly preferably, the guide holder is provided such that the saw blade lies flat against one of the side faces of the guide holder while being guided by the guide holder.

In particular, the guide holder is designed to be open toward at least one side, in particular a front side. Preferably, the guide holder is at least largely, in particular at least substantially completely delimited by the two guide elements, in particular the guide element and the other guide element. Preferably, the guide holder is delimited by the two guide elements at least at the two side faces of the guide holder. In particular, the two side faces of the guide holder are designed on opposite sides of the two guide elements. Preferably, the guide faces each extend at least largely along a maximum cross-sectional surface of the guide holder, the surface extending in particular at least substantially perpendicular to the offset direction and/or the extent of the width of the guide holder and/or at least substantially parallel to the central plane and/or the side faces of the guide holder. Preferably, a minimum spacing of the guide faces, in particular a spacing oriented along the offset direction, formed at least substantially parallel to the extent of the width of the guide holder, corresponds to a difference of the width of the guide holder between the various guiding positions. Preferably, the guide holder extends, in particular independently of an adjusted guiding position, at least substantially perpendicular to the extent of the width of the guide holder and/or to the offset direction, and at least substantially perpendicular to a depth of the holder recess, along a maximum main extension of at least 0.5 cm, preferably at least 1 cm, and more preferably at least 1.5 cm. In particular, the guide faces each extend at least substantially perpendicular to the extent of the width of the guide holder and/or the offset direction, and at least substantially perpendicular to a depth of the holder recess along a maximum main extension of at least 0.5 cm, preferably at least 1 cm and more preferably at least 1.5 cm. In particular, the saw blade guiding device, in particular the guide unit, can be operated to adjust the width of the guide holder without tools.

It is conceivable that the guide element and/or the other guide element each have a chamfer and/or an outer surface which is oblique relative to the main extension plane of the respective guide element, and oblique relative to the offset direction and/or to the width of the guide holder. In particular, the chamfer and/or the outer surface is provided to allow the saw blade, in particular the saw blade back, to be held by the guide holder, whereby in particular the saw blade, in particular the saw blade back, is received in the guide holder via a side of the side faces of the guide holder which comprises the chamfer and/or the outer surface.

Using the embodiment of the saw blade guiding device according to the disclosure, an advantageously simple and fast change of the width of the guide holder can be made possible, in particular because it is only necessary to arrange another guide face of the guide element in a region of the guide holder. By adjusting the width of the guide holder to a thickness of a saw blade to be guided, it can be advantageously prevented that the saw blade goes off course in curved sections, in particular even when relatively thin saw blades are used. An adjustable guide holder can advantageously be embodied which does not depend on a width of the guide holder which changes along a depth of the guide holder. In particular, contact points between the guide holder and the saw blade can be advantageously prevented in this way. In particular, unwanted abrasion of a guide element and/or the saw blade can be advantageously prevented. An advantageously compact saw blade guiding device with an adjustable guide holder width can be made possible, in particular since it is only the guide element that has to be moved in order to change the width of the guide holder. A U-shaped guide holder with an adjustable width can advantageously be made possible, which advantageously also allows thinner saw blades to be guided advantageously securely.

Furthermore, it is proposed that the guide element is movably mounted in order to adjust the width of the guide holder, and that it features at least two guiding positions. In the at least two guiding positions of the guide element, a respective different one of the at least two guide faces of the guide element forms a side face of the guide holder. An advantageously compact saw blade guiding device can be made possible. In particular, by moving the guide element, an advantageously fast and simple adjustment of the width of the guide holder can be made possible. In particular, the saw blade guiding device comprises at least one holding unit, the guiding element being mounted movably relative to the holding unit in order to adjust the width of the guide holder. Preferably, the guide element is movably mounted on the holding unit. Preferably, it is provided that the guide element is moved upon a change in the guiding position such that a different one of the at least two guide faces is arranged in a region of the guide holder and forms a side face of the guide holder. Preferably, each of the guide faces of the guide element has at least substantially identically the same maximum main extension. In particular, the guide faces of the guide element, in particular along the offset direction and/or the extent of the width of the guide holder, each have a basic surface, i.e. a basic shape that is at least substantially identical. In particular, the guide holder has a different value for the width of the guide holder in each of the guiding positions of the guide element. Preferably, a direction of extension of the width of the guide holder is at least substantially identical in the different guiding positions of the guide element.

In addition, it is proposed that in order to adjust the width of the guide holder, the guide element is designed to be rotatable about an axis of rotation of the guide element, whereby the at least two guide faces of the guide element are arranged in a circumferential direction offset with respect to one another about the axis of rotation. An advantageously compact saw blade guiding device can be made possible, in particular because a width of the guide holder can be advantageously changed independent of a change of external dimensions of the saw blade guiding device, in particular of the guide element. Preferably, a change in the width of the guide holder can be made possible advantageously in confined spaces, e.g. in a state in which the saw is set in place. Preferably, the rotational axis of the guide element is oriented at least substantially perpendicular to the central plane of the guide holder, to the side faces, in particular to the main extension planes of the side faces, of the guide holder and/or the guide faces, in particular to the main extension planes of the guide faces, of the guide element. Preferably, the axis of rotation of the guide element is oriented at least substantially parallel to the offset direction and/or the extent of the width of the guide holder. Preferably, the circumferential direction is formed inside of a plane extending perpendicular to the axis of rotation. The guide unit comprises at least one bearing element, in particular a pin, a bolt, a passage or the like, for providing rotatable support of the guide element. Preferably, the bearing element is provided to rotatably mount the guide element on the holding unit. Preferably, the bearing element extends at least substantially parallel to the axis of rotation. Preferably, the guide element is at least substantially plate-shaped and/or disk-shaped. In particular, the guide element features, at least substantially perpendicular to the axis of rotation, a maximum transverse extension which, in particular, is greater than a maximum height of the guide element extending at least substantially parallel to the axis of rotation. It is conceivable that the guide holder extends, radially relative to the axis of rotation, up to the axis of rotation and/or the up to the bearing element or is at a distance from the axis of rotation and/or the bearing element. Preferably, the guide unit comprises actuating means for actuating the guide element in order to adjust the width of the guide holder. The actuating means are preferably provided for actuation by a user given rotation of the guide element about the axis of rotation. In particular, the actuating means are arranged on the guide element in an evenly distributed manner about the axis of rotation. Particularly preferably, the actuating means are designed to be integral with the guide element or are formed by the guide element. In particular, the guide unit, in particular the guide element, can be actuated without tools to adjust the width of the guide holder.

It is also proposed that the saw blade guiding device comprises at least one, in particular the aforementioned, holding unit, which is at least substantially fixed to the housing in order to retain the guide unit, whereby the guide unit comprises at least one fixing means, the guide element being movably mounted relative to the holding unit in order to adjust the width of the guide holder, the fixing means being provided to fix the guide element in at least one of the guiding positions relative to the holding unit. Advantageously, a simple and intuitive operation of the saw blade guiding device for changing the width of the guide holder can be achieved. An advantageously simple embodiment of the guide element and the holding unit can be made possible in order to fix the guide element. The at least one fixing means is preferably provided to connect the guide element to the holding unit, in particular to a holding element of the holding unit in order to fix the guide element relative to the holding unit in an interlocking and/or frictional manner. The holding unit, in particular the holding element, is preferably provided to surround the guide element, as viewed perpendicular to the axis of rotation. It is conceivable that the other guide element be designed to be integral with the holding unit, in particular with the holding element. The term "integrally" is in particular understood to mean a bonded connection, e.g., by means of a welding process and/or an adhesive process, etc. and particularly advantageously integrally formed via manufacture from a casting and/or via manufacture in a single-component or multiple-component injection molding process. It is alternatively conceivable that the holding unit, in particular the holding element, is provided to surround the guide element, as viewed perpendicular to the axis of rotation.

It is further proposed that the guide unit comprise a plurality of fixing means arranged on the guide element, the individual fixing means being provided to fix the guide element in one of the guiding positions in a frictional and/or interlocking manner. Advantageously secure and robust fixing of the guide element can be achieved. In particular, unwanted shifting of the guide holder and/or tilting of the saw blade inside the guide holder can be advantageously prevented. In addition, a plurality of guiding positions of the guide element having different widths of the guide holder can be advantageously easily made possible, whereby the guide element can be fixed in each guiding position. Preferably, the fixing means are designed as catch elements for a catch connection, as friction surfaces or the like. Preferably, the fixing means are designed to be projections which are integrally formed with the guide element, the projections being arranged in particular at a distance from the axis of rotation. The holding unit, in particular the holding element, preferably delimits at least one recess, which is provided to cooperate with the fixing means in order to fix the guide element. The holders of the holding unit are preferably provided to receive at least one fixing means via a movement of the holder and/or the fixing means in a direction oriented at least substantially parallel to the axis of rotation, the fixing means in particular being at least partially arranged inside the holder. In particular, the fixing means are arranged on the guide element distributed around the axis of rotation. In particular, the holder of the holding unit is provided to cooperate with a respectively different one of the fixing means, depending on a guiding position to be adjusted. Preferably, the fixing means are arranged on a side of the guide element which faces away from a side of the guide element which comprises the guide faces. In particular, each of the fixing means extends from an outer surface of the guide element in a direction oriented at least substantially parallel to the axis of rotation and/or the offset direction, in particular away from the respective outer surface of the guide element. In particular, a number of the fixing means corresponds to at least a number of guide faces of the guide element. In particular, the guide unit comprises at least two fixing means. Alternatively, it is conceivable that the fixing means are designed as recesses delimited by the guide element. In particular, the holding unit, in particular the holding element, comprises at least one projection, which is provided to fix the guide element relative to the holding unit in order to cooperate with one of the recesses delimited by the guide element. The guide element is preferably designed to be fixed relative to the holding unit in one of the guiding positions of the guide element, in particular via the fixing means.

It is further proposed that the guide unit comprise at least one reset element, which is provided to counteract movement of the guide element from one of the guiding positions. Advantageously, automatic fixing of the guide element via the fixing means can be achieved, in particular independent of user activity. An advantageously high degree of safety can be achieved this way. In particular, unwanted shifting and/or guidance of the saw blade coming loose due to improper and/or incorrect use of the saw blade guiding device can be advantageously prevented. The guide element is preferably provided to be moved at least substantially parallel to the axis of rotation and/or the offset direction in order to move from one of the guiding positions, whereby in particular an interlocking and/or frictional connection of the guide element and the holding unit is disengaged via the fixing means. The reset element is particularly provided to apply a resetting force to the guide element against movement along the axis of rotation. For example, the reset element is designed as a spring, in particular a compression or tension spring, as a magnet, or the like. In particular, the reset element is arranged between the guide element and the other reset element or the holding unit, in particular the holding element. Preferably, the reset element is arranged on the bearing element. The bearing element is in particular provided to hold, in particular to center, the reset element relative to the axis of rotation. The reset element preferably extends at least substantially parallel to the axis of rotation. The reset element is preferably arranged at a distance from the guide holder and the guide faces. In particular, the reset element is, via the reset force, provided to retain the guide element and the holding unit, in particular the holding element, in a state of connection to one another via the fixing means. Alternatively, it is conceivable that the guide element be movable at least substantially parallel to the axis of rotation and/or the direction of offsetting via a screw thread. In particular, the guide element is connected to the bearing element, to the holding unit, in particular the holding element, and/or to the other guide element via a screw thread. The guide element is preferably provided to be moved at least substantially parallel to the axis of rotation and/or the offset direction via the screw thread by rotation about the axis of rotation in order to adjust the width of the guide holder. The fixing means are preferably provided, via at least one stop on the holding unit, in particular on the holding element, to limit a movement of the guide element performed via the screw thread about the axis of rotation in at least one direction, and/or limit movement for at least one guiding position, in particular for the possible guiding positions.

It is further proposed that the other guide element comprise at least two guide faces on a side facing the guide element, each of the guide faces being provided to form another side face of the guide holder, the at least two guide faces of the other guide element being arranged offset with respect to one another at least substantially parallel to the extent of the width of the guide holder. An advantageous embodiment for use on saws having a centered guide of a saw blade can be enabled. In addition, an advantageously high number of different widths of the guide holder can be achieved in an embodiment of the guide elements which is simultaneously advantageously simple. It is conceivable that the guide faces of the other guide element and/or the other guide element be designed to be at least substantially identical to the guide faces of the guide element and/or identical to the guide element. Alternatively, it is conceivable that the guide faces of the other guide element have different spacings, at least substantially parallel to the extent of the width of the guide holder, than the guide faces of the guide element. Preferably, the guide element and the other guide element are provided to specify a respective width of the guide holder via a minimum spacing of two guide faces arranged in the region of the guide holder. Preferably, the guide element and the other guide element are each movably mounted, in particular rotatably, relative to the holding unit, in particular the holding element. In particular, the guide element and the other guide element are movably mounted, in particular rotatably, relative to one another. Preferably, the guide element and the other guide element are each mounted rotatably about the axis of rotation. In particular, the guide faces of the other guide element are arranged at least substantially in an evenly distributed manner about the axis of rotation. It is conceivable that the guide unit, in particular the other guide element, preferably substantially analogous to the guide element, comprises fixing means for fixing the other guide element relative to the holding unit, in particular relative to the holding element or another holding element of the holding unit. Alternatively or additionally, it is conceivable that the guide unit, in particular substantially analogous to the reset element, comprises at least one further reset element which is provided to counteract movement of the other guide element from one of the guiding positions. In particular, the guide faces of the other guide element are designed offset with respect to one another in the offset direction. Preferably, the guide faces of the other guide element are each substantially planar, at least in regions.

It is further proposed that the other guide element is movably coupled to the guide element, in particular rotatably about an axis of rotation, in order to adjust the width of the guide holder, whereby in the at least two guiding positions of the guide element and the other guide element, other respective guide faces of the guide element and the other guide element form the guide holder. Advantageously, a simple-to-operate saw blade guiding device can be achieved. Advantageously, a relative movement of the guide elements can be prevented. It is conceivable that the guide element and the other guide element can be integrally designed or designed movably in a coupled manner other than a movement about the axis of rotation. For example, the guide unit comprises at least one coupling element for rotationally coupling the the guide element and the other guide element. Preferably, the coupling element is designed as a pin, as a bolt, as a magnetic connection, or the like. Preferably, the coupling element is arranged between the guide element and the other guide element. The coupling element is preferably provided to connecting the guide element and the other guide element to each other in an interlocking and/or frictional manner at least during movement of the guide element and the other guide element about the axis of rotation. It is conceivable that the guide element and the other guide element be moved at least substantially parallel to the axis of rotation relative to one another given a design in which the connection between the guide element and the other guide element take places via the coupling element. For example, the guide element and the other guide element each delimit a guide recess for receiving the coupling element, the coupling element being arranged inside the guide recesses of the guide element and the other guide element. Preferably, the guide recesses together have a maximum longitudinal extent that is greater than a maximum longitudinal extent of the coupling element. In particular, the holding unit comprises at least one holding element, which is provided to cooperate with the guide element and/or the other guide element in order to fix the guide element and the other guide element relative to a rotation about the axis of rotation, in particular using fixing means. In particular, the holding element is provided to be at least temporarily separated from the guide element and/or the other guide element in order to disengage the guide element and the other guide element from a guiding position. For example, the holding element is provided to clamp the guide element and the other guide element along the axis of rotation using a reset force. In particular, the holding element is provided to be pushed apart from one another from a guiding position against the reset force in order to disengage the guide element and the other guide element, in particular whereby a fixing of the guide element and the other guide element against a rotation about the axis of rotation is disengaged. In particular, a guide face of the guide element and a guide face of the other guide element are respectively arranged in a row at a point about the axis of rotation, and are provided to form a guide holder having a width corresponding to a minimum spacing of the two guide faces.

It is also proposed that the guide element on the side facing the other guide element comprises three guide faces, each of which is provided to forming the side face of the guide holder, the three guide faces of the guide element being arranged offset with respect to one another at least substantially parallel to the extent of the width of the guide holder, and the three guide faces of the guide element being arranged at a regular distance distributed about the axis of rotation, the three guide faces each extending over an angular range of at least 90°, preferably at least 100°, and more preferably at least 110°, about the axis of rotation. An advantageously high number of guiding positions can be achieved, in particular while simultaneously maintaining sufficient depth of the guide recess and an advantageously compact embodiment of the guide element. In particular, the three guide faces are each arranged offset from one another by 120° around the axis of rotation. Alternatively or additionally, it is conceivable that the other guide element comprises three guide faces on the side facing the guide element, each of which is provided to form the other side face of the guide holder, the three guide faces of the other guide element being arranged offset with respect to one another at least substantially parallel to the extent of the width of the guide holder, the three guide faces of the other guide element being arranged at a regular distance distributed about the axis of rotation, the three guide faces each extending over an angular range of at least 90° about the axis of rotation. Preferably, the guide faces of the guide element and/or the other guide element are each designed at a distance from one another when viewed along the offset direction. Preferably, the guide faces of the guide element and/or the guide faces of the other guide element each extend along the offset direction as viewed from an outside of the respective guide element facing away from the axis of rotation over at least 10%, preferably at least 15%, and preferably at least 20%, of the maximum transverse extent of the respective guide element, corresponding in particular to a diameter of the respective guide element, oriented perpendicular to the axis of rotation.

In addition, a saw, in particular a jig saw, is proposed, having at least one saw blade guiding device according to the disclosure. Preferably, the saw blade guiding device is designed as part of the saw. The saw blade guiding device is preferably arranged on and/or below a tool holder of the saw and is provided to hold the saw blade. The saw blade guiding device is preferably arranged and/or designed such that the guide holder is designed to be open on a side of the guide holder facing away from the untoothed back of the saw blade.

Due to the embodiment of the saw according to the disclosure, an advantageously simple and fast changing of the width of the guide holder can be made possible during a saw blade change. An advantageously low-maintenance saw can be realized, in particular because contact points between the guide holder and the saw blade can advantageously be omitted. An advantageously compact saw can be made possible. An advantageously clear connection region for fastening the saw blade can be achieved.

The saw blade guiding device according to the disclosure and/or the saw according to the disclosure should not be limited to the application and embodiment described hereinabove. In particular, in order to fulfill a functionality described herein, the saw blade guiding device according to the disclosure and/or the saw according to the disclosure can comprise a number of individual elements, components, and units that deviates from a number mentioned herein. Moreover, regarding the ranges of values indicated in this disclosure, values lying within the limits specified hereinabove are also intended to be considered as disclosed and usable as desired.

BRIEF DESCRIPTION OF THE DRAWINGS

Further advantages will become apparent from the following description of the drawings. The drawings show three exemplary embodiments of the disclosure. The drawings, the description, and the claims contain numerous features in combination. A skilled person will appropriately also consider the features individually and combine them into additional advantageous combinations.

Shown are.

DETAILED DESCRIPTION

Figure 1:
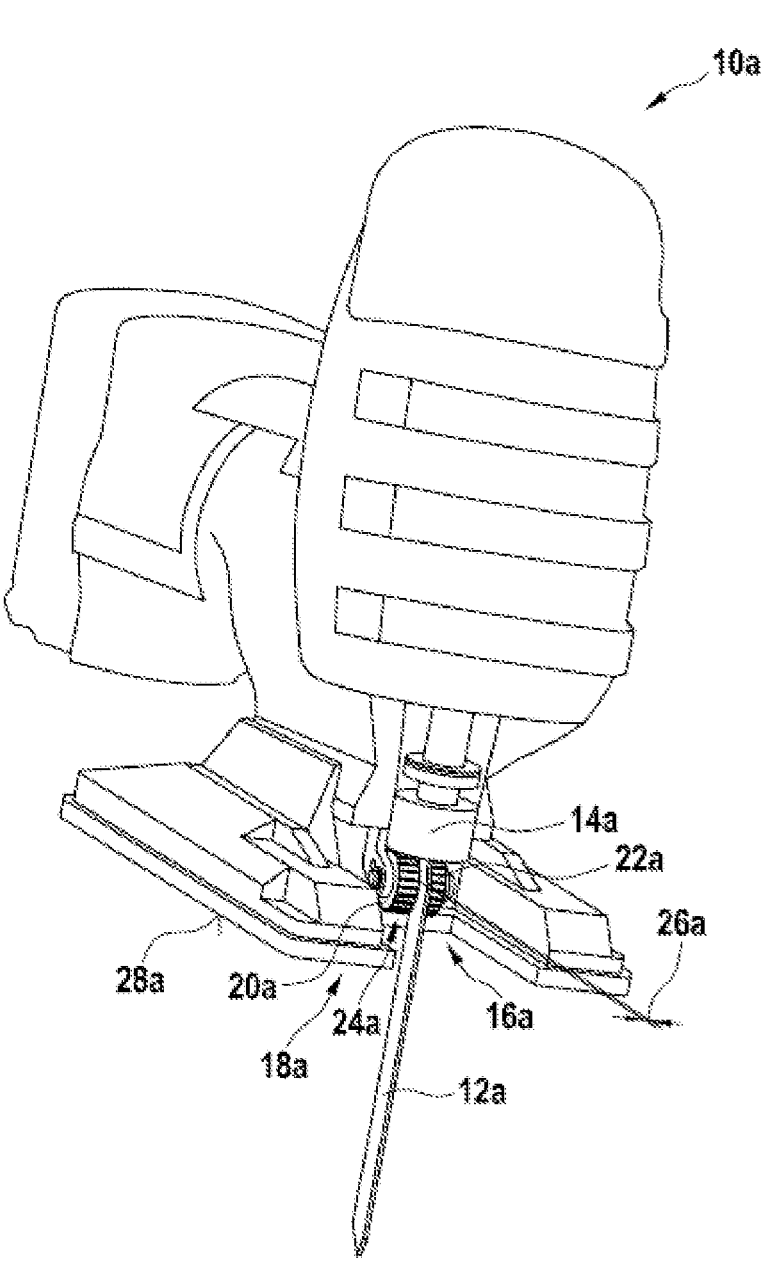
FIG. 1 a perspective illustration of a saw according to the disclosure, designed as a jig saw, having a saw blade guiding device according to the disclosure, FIG. 2 a schematic sectional view of the saw blade guiding device according to the disclosure, FIG. 3 a perspective view of a guide element of the saw blade guiding device according to the disclosure comprising three guide faces at a distance from one another, FIG. 4 a side view of the guide element of the saw blade guiding device according to the disclosure, FIG. 5 a perspective view of the saw blade guiding device according to the disclosure, with a holding unit and a guide unit, FIG. 6 a perspective illustration of an alternative embodiment of a saw blade guiding device according to the disclosure for a saw according to the disclosure, the guiding device comprising two movable guide elements, each of which comprises a plurality of guide faces, and FIG. 7 a schematic cross-sectional view of a further alternative embodiment of a saw blade guiding device according to the disclosure, comprising a guide element which is movable via a screw thread, the guide element comprising transitioning guide faces.

In FIG. 1, a perspective view of a saw $10a$ designed as a jig saw is shown. The saw $10a$ is designed as a hand-held machine tool in particular. The saw $10a$ is in particular designed to be battery operated. The saw $10a$ comprises a saw blade $12a$, a tool holder $14a$ for fastening the saw blade $12a$ and a saw blade guiding device $16a$ for guiding the saw blade $12a$ during a sawing operation. Saw blade guiding device $16a$ is arranged below the tool holder $14a$. The saw blade guiding device $16a$ comprises a guide unit $18a$ for guiding the saw blade $12a$ during a sawing operation. The guide unit $18a$ comprises two guide elements $20a$, $22a$ (see FIG. 2), which are provided to together form a guide holder $24a$ for an untoothed saw blade back of the saw blade $12a$. A width $26a$ of the guide holder $24a$ (see FIG. 2) is adjustable via the two guide elements $20a$, $22a$, preferably in order to guide saw blades $12a$ of different thicknesses. The saw blade guiding device $16a$ is preferably designed to be at a distance from a processing plane on which a workpiece to be processed by the saw $10a$ is arranged, the spacing created by a contact surface $28a$ of the saw $10a$, the contact surface contacting the workpiece.

Figure 2:
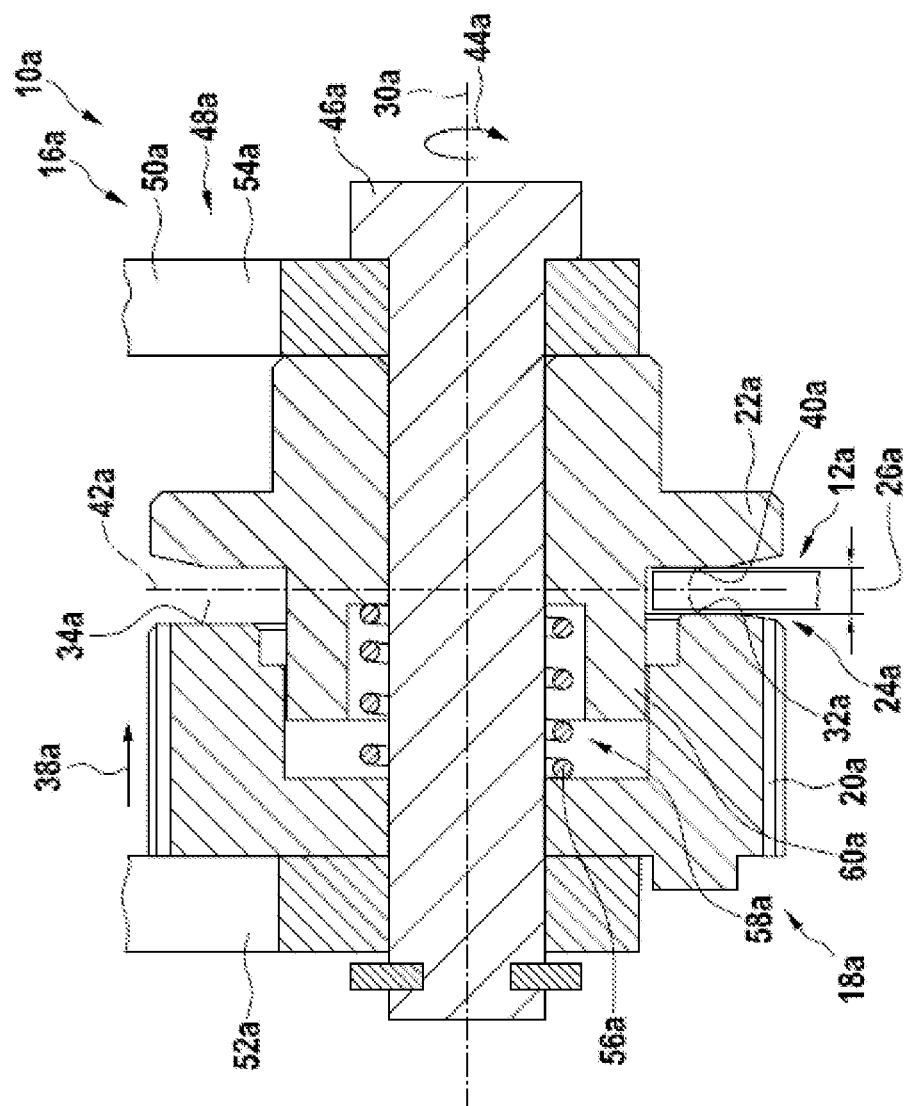

In FIG. 2, a sectional view of the saw blade guiding device $16a$ is shown, in particular whereby a sectional plane includes an axis of rotation $30a$ of the guide element $20a$. One guide element $20a$ of the two guide elements $20a$, $22a$ comprises, on a side facing the other guide element $22a$ of the two guide elements $20a$, $22a$, three guide faces $32a$, $34a$, $36a$ (see FIG. 3; only two are shown in FIG. 2), each of which is provided to form a side face of the guide holder $24a$, in particular depending on a guiding position of the guide element $20a$. Embodiments of the guide element $20a$ are also conceivable which have one of three different numbers of guide faces $32a$, $34a$, $36a$, for example with only two guide faces $32a$, $34a$, $36a$ or with more than three, in particular four or five, guide faces $32a$, $34a$, $36a$. The three guide faces $32a$, $34a$, $36a$ of the guide element $20a$ are arranged at least substantially parallel to an extent of the width $26a$ of the guide holder $24a$ offset from one another. The three guide faces $32a$, $34a$, $36a$ of the guide element $20a$ are formed on the guide element $20a$ offset from one another in an offset direction $38a$. The guide element $20a$ is movably mounted in order to adjust the width $26a$ of the guide holder $24a$, and features three different guiding positions; in the three guiding positions of the guide element $20a$, another of the three guide faces $32a$, $34a$, $36a$ of the guide element $20a$ in each case forms a side face of the guide holder $24a$. The guide holder $24a$ has a different value for the width $26a$ of the guide holder $24a$ for each of the guide faces $32a$, $34a$, $36a$ of the guide element $20a$ when arranged in a region of the guide holder $24a$. In particular, the width $26a$ of the guide holder $24a$ is defined by the minimum spacing of the respective guide face $32a$, $34a$, $36a$ arranged in the region of the guide holder $24a$ of the guide element $20a$ from the other guide element $22a$, in particular from a side face $40a$ of the other guide element $22a$ which is opposite to the respective guide face $32a$, $34a$, $36a$ in the region of the guide holder $24a$ in the offset direction $38a$ and which in particular forms another side face of the guide holder $24a$. In particular, the guide holder $24a$ features a central plane $42a$. Preferably, the central plane 42a extends perpendicular to the extent of the width 26a of the guide holder 24a. In particular, the guide holder 24a is designed such that a point on the side face comprising one of the respective guide faces 32a, 34a, 36a of the guide holder 24a, in particular one of the two side faces of the guide holder, said point being nearest to the central plane 42a when in a guiding position, lies within a planar surface of the guide element 20a or of the other guide element 22a, the planar surface being oriented parallel to the central plane 42a. Preferably, the guide element 20a, in particular the three guide faces 32a, 34a, 36a of the guide element 20a, are designed such that a maximum width 26a of the guide holder 24a is at most 4 mm, preferably at most 3 mm, and more preferably at most 2 mm. The guide element 20a, in particular the three guide faces 32a, 34a, 36a of the guide element 20a, are designed such that the width 26a of the guide recess 24a in the three guiding positions of the guide element 20a is at least substantially 1.8 mm, 1.5 mm and 1.2 mm.

The guide element 20a is rotatably designed in order to adjust the width 26a of the guide holder 24a about the axis of rotation 30a of the guide element 20a, whereby the three guide faces 32a, 34a, 36a of the guide element 20a are arranged offset from one another in a circumferential direction 44a about the axis of rotation 30a. The guide unit 18a comprises a bearing element 46a designed as a bolt for rotatably supporting the guide element 20a about the axis of rotation 30a. In particular, the guide element 20a is movably mounted at least on the bearing element 46a in a direction oriented at least substantially parallel to the axis of rotation 30a.

The saw blade guiding device 16a comprises a holding unit 48a, which is at least substantially fixed to the housing in order to retain the guide unit 18a. In particular, the holding unit 48a is provided in order to attach the saw blade guiding device 16a to the saw 10a. The holding unit 48a comprises a holding element 50a, which encompasses the guide element 20a like a bracket (see FIG. 5). The other guide element 22a is designed to be integral with the holding unit 48a, in particular with the holding element 50a. It is also conceivable that the other guide element 22a is designed separately from the holding element 50a, in particular the holding element 50a encompasses the guide element 20a and the other guide element 22a. The bearing element 46a is attached to the holding element 50a. In particular, the bearing element 46a provides the axis of rotation 30a of the guide element 20a. Preferably, the bearing element 46a is freely rotatable about the axis of rotation 30a. Alternatively, it is conceivable that the bearing element 46a is arranged in a non-rotational manner relative to the axis of rotation 30a, for example by fixing it to the retaining element 50a. Preferably, the holding element 50a limits movement of the guide element 20a in a direction oriented at least substantially parallel to the axis of rotation 30a. The bearing element 46a is in particular retained by a retaining pin and a head part of the bearing element 46a between two bracket portions 52a, 54a of the holding element 50a. In particular, the holding element 50a encompasses the guide unit 18a, in particular the guide element 20a via the bracket portions 52a, 54a, in particular in a region of the axis of rotation 30a (see FIG. 5).

The guide unit 18a comprises a reset element 56a, which is provided to counteract movement of the guide element 20a from one of the guiding positions. The reset element 56a is designed as a compression spring. The reset element 56a is arranged between the guide element 20a and the other guide element 22a. The reset element 56a is provided in order to apply a reset force to the guide element 20a when the holding element 50a, in particular, a bracket portion 52a of the holding element 50a against which the guide element 20a is seated in a guiding position, moves away in the direction of the other guide element 22a, the reset force being directed away from the other guide element 22a and/or toward the holding element 50a, in particular the bracket portion 52a of the holding element 50a, against which the guide element 20a is seated in a guiding position. The reset element 56a is arranged around the bearing element 46a. The reset element 56a is arranged centered relative to the axis of rotation 30a, particularly by the bearing element 46a. The guide element 20a and the other guide element 22a together delimit a recess 58a in a central region surrounding the bearing element 46a and/or surrounding the axis of rotation 30a, said recess being provided to hold the reset element 56a. The recess 58a is preferably designed to be at a distance from the guide holder 24a. In particular, the other guide element 22a forms an inner wall 60a, which delimits the guide holder 24a on one side of the inner wall 60a and delimits the recess 58a on another side of the inner wall 60a which faces away from the side of the inner wall 60a. Other embodiments of the guide unit 18a, in particular of the guide element 20a, the other guide element 22a and/or the reset element 56a are conceivable, for example whereby the guide element 20a forms the inner wall 60a, the reset element 56a is designed as a reset element other than a spring, the reset element 56a is designed as a tension spring, and in particular is arranged between the reset element 50a and the guide element 20a, or the like.

Figure 3:
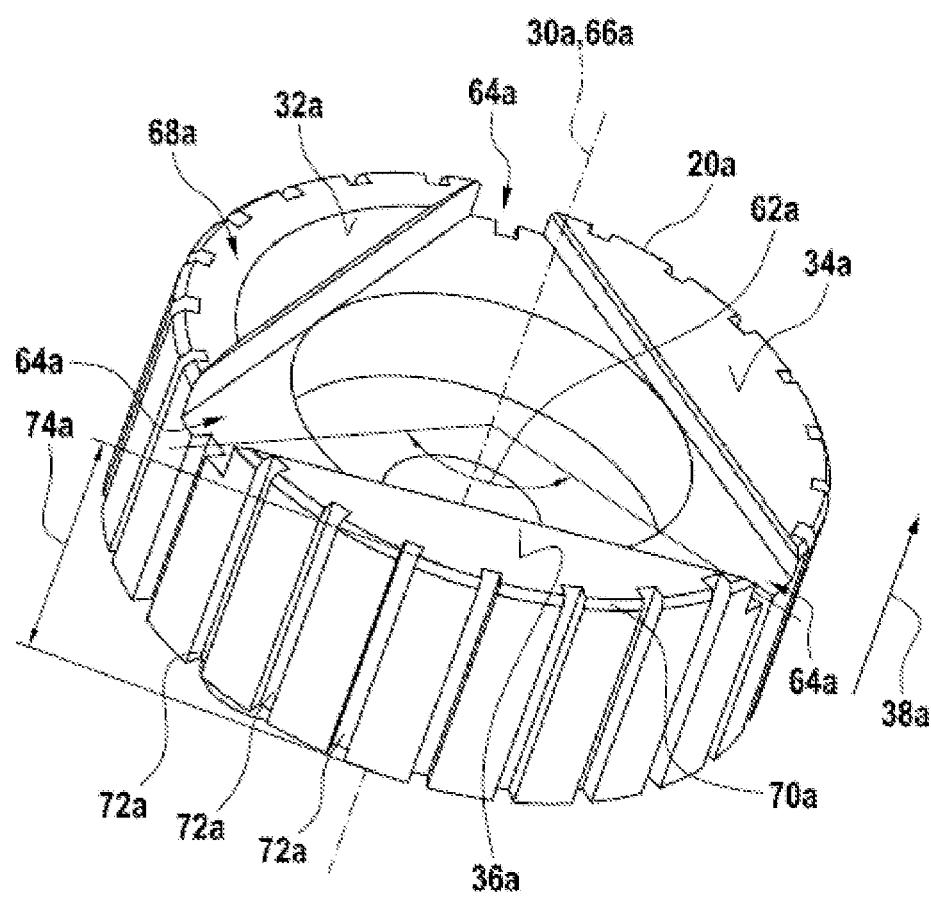

FIG. 3 shows a perspective view of the guide element 20a. The three guide faces 32a, 34a, 36a of the guide element 20a are arranged offset with respect to one another at least substantially parallel to the extent of the width 26a of the guide holder 24a. The three guide faces 32a, 34a, 36a of the guide element 20a are arranged at a regular distance distributed about the axis of rotation 30a. The three guide faces 32a, 34a, 36a of the guide element 20a each extend along an angular range 62a of at least 90°, preferably at least 100°, and preferably at least 110°, around the axis of rotation 30a. The three guide faces 32a, 34a, 36a are arranged at a distance from one another, in particular whereby a gap 64a is in each case formed between two adjacent guide faces of the three guide faces 32a, 34a, 36a. One guide face 32a of the three guide faces 32a, 34a, 36a comprises a tapered region 68a in an exterior region facing away from the axis of rotation 30a, or rather from a central axis 66a of the guide element 20a, whereby the guide face 32a is oriented oblique relative to the central plane 42a, and to the offset direction 38a or the axis of rotation 30a. In particular, the tapered region 68a is provided in order to simplify the holding of the saw blade 12a. The three guiding surfaces 32a, 34a, 36a are each at least substantially planar in regions. In particular, the guide element 20a in an outermost edge region of the three guide faces 32a, 34a, 36a each comprises a chamfer 70a. The guide unit 18a comprises actuating means 72a for actuating the guide element 20a in order to adjust the width 26a of the guide holder 24a. The actuating means 72a are provided to actuate the guide element 20a by a user given rotation of the guide element 20a about the axis of rotation 30a. The actuating means 72a are designed as groove-like recesses that are arranged in an evenly distributed manner about the axis of rotation 30a on the guide element 20a. In particular, the actuating means 72a are arranged in the circumferential direction 44a about the axis of rotation 30a distributed on a lateral surface of the guide element 20a. The actuating means 72a are delimited by guide element 20a.

The actuating means 72*a* are designed to be integral with the guide element 20*a*. The actuating means 72*a* each extend beyond a maximum height 74*a* of the guide element 20*a*. The guide element 20*a* features a basic, at least substantially cylindrical, shape. The guide faces 32*a*, 34*a*, 36*a* are each shaped like at least substantially circular segments.

Figure 4:
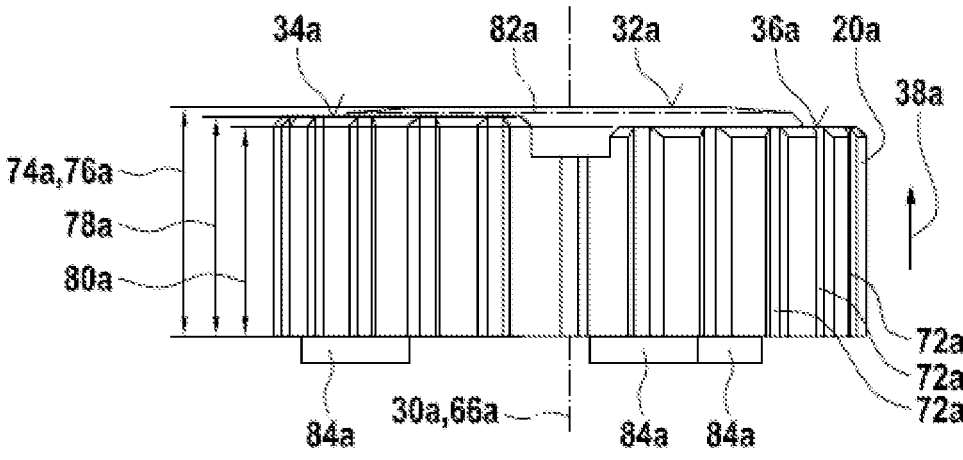

In FIG. 4, the guide element 20*a* is shown in a side view, in particular perpendicular to the axis of rotation 30*a*, i.e., to the central axis 66*a* of the guide element 20*a*. The guide element 20*a* features a different maximum height extension 76*a*, 78*a*, 80*a* in the regions of the three guide faces 32*a*, 34*a*, 36*a*, whereby in particular a maximum height extension 76*a* of the guide element 20*a* in a region of the guide face 32*a* corresponds to the maximum height 74*a* of the guide element 20*a*. The maximum height extensions 76*a*, 78*a*, 80*a* and/or the maximum height 74*a* of the guide element 20*a* are respectively oriented parallel to the offset direction 38*a* and/or the axis of rotation 30*a*. The guide faces 32*a*, 34*a*, 36*a* of the guide element 20*a* each have a main extension plane 82*a* (shown for example in FIG. 4 for the guide face 32*a*) which are respectively oriented at least substantially perpendicular to the axis of rotation 30*a*, i.e. the central axis 66*a* of the guide element 20*a*.

The guide unit 18*a* includes three fixing means 84*a*, each designed as a projection. The fixing means 84*a* are provided to fix the guide element 20*a* in at least one of the guiding positions relative to the holding unit 48*a*. The fixing means 84*a* are designed to be integral with the guide element 20*a*. The fixing means 84*a* are arranged on a side of the guide element 20*a* which faces away from a side of the guide element 20*a* which comprises the guide faces 32*a*, 34*a*, 36*a*. Each of the fixing means 84*a* extends from an outer wall of the guide element 20*a* at least substantially parallel to the axis of rotation 30*a*, i.e. the center axis 66*a* of the guide element 20*a* away from the guide element 20*a*, in particular in a direction facing away from the guide faces 32*a*, 34*a*, 36*a*. In particular, the fixing means 84*a* are each not included in the maximum height extensions 76*a*, 78*a*, 80*a* of the guide element 20*a*.

Figure 5:
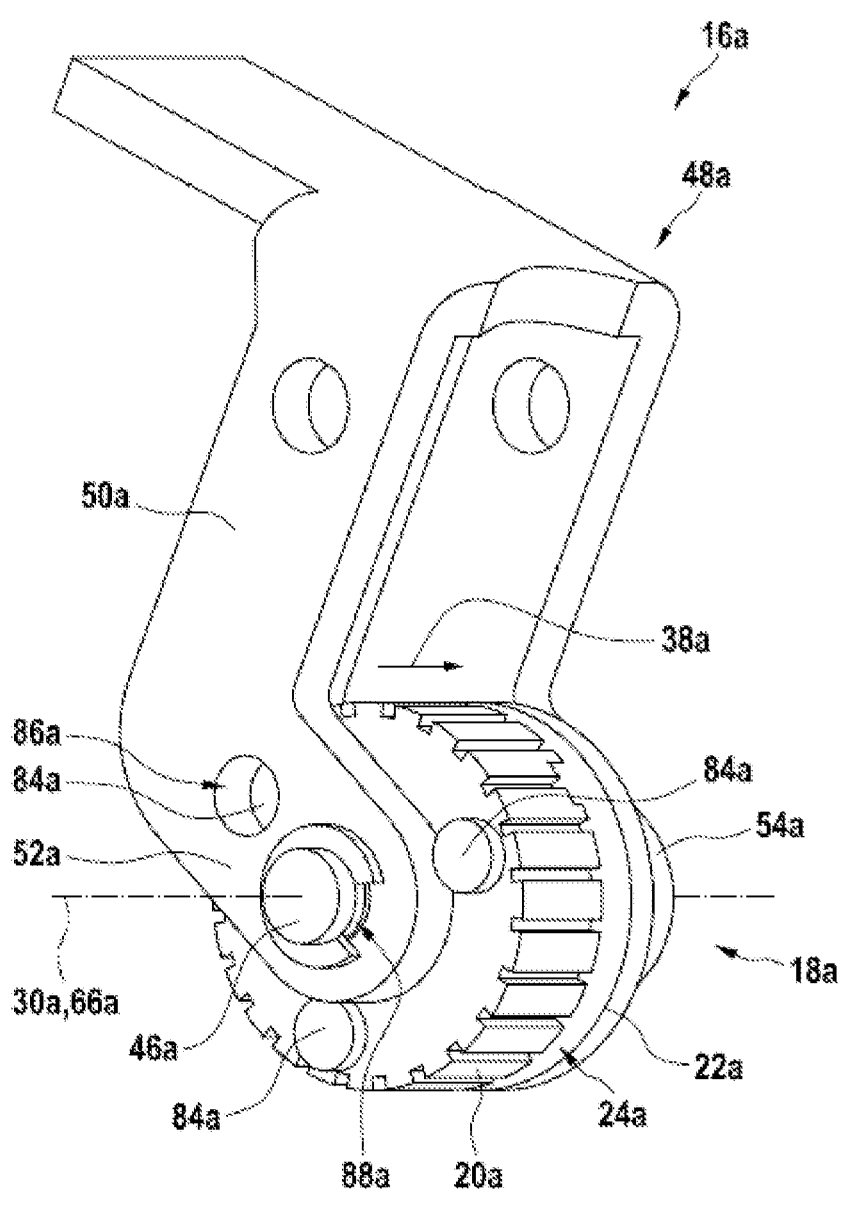

In FIG. 5, the saw blade guiding device 16*a* is shown in a perspective view. The individual fixing means 84*a* are provided to fix the guide element 20*a* to the holding unit 48*a*, in particular the holding element 50*a*, in one of the guiding positions in a frictional and/or interlocking manner. The fixing means 84*a* are arranged on the guide element 20*a* in an evenly distributed manner around the axis of rotation 30*a*, i.e., the central axis 66*a* of the guide element 20*a*. The holding element 50*a* delimits a recess 86*a* at a distance from the axis of rotation 30*a*, or rather from the bearing element 46*a*. The recess 86*a* delimited by the holding element 50*a* is designed to correspond, in particular with respect to a basic shape, to the individual fixing means 84*a*. In particular, the fixing means 84*a* and the recess 86*a* each have a basic shape that is at least substantially cylindrical. The bracket portion 52*a* of the holding element 50*a* delimits the recess 86*a*. The holding element 50*a*, particularly via the two bracket portions 52*a*, 54*a*, delimits a passage 88*a* for holding the bearing element 46*a*. Alternatively, other embodiments of the fixing means 84*a* and/or the holding element 50*a* are conceivable, for example having one of three different numbers of fixing means 84*a*, with more than one recess 86*a*, with a plurality of holding elements 50*a* each of which, in particular, forms a bracket portion 52*a*, 54*a*, and/or having a different basic shape of the fixing means 84*a* and the recess 86*a*. Particularly preferably, a number of fixing means 84*a* of the guide unit 18*a* corresponds to an integer multiple of the number of different guiding positions, or the number of different guide faces 32*a*, 34*a*, 36*a* of the guide element 20*a*.

Figure 6:
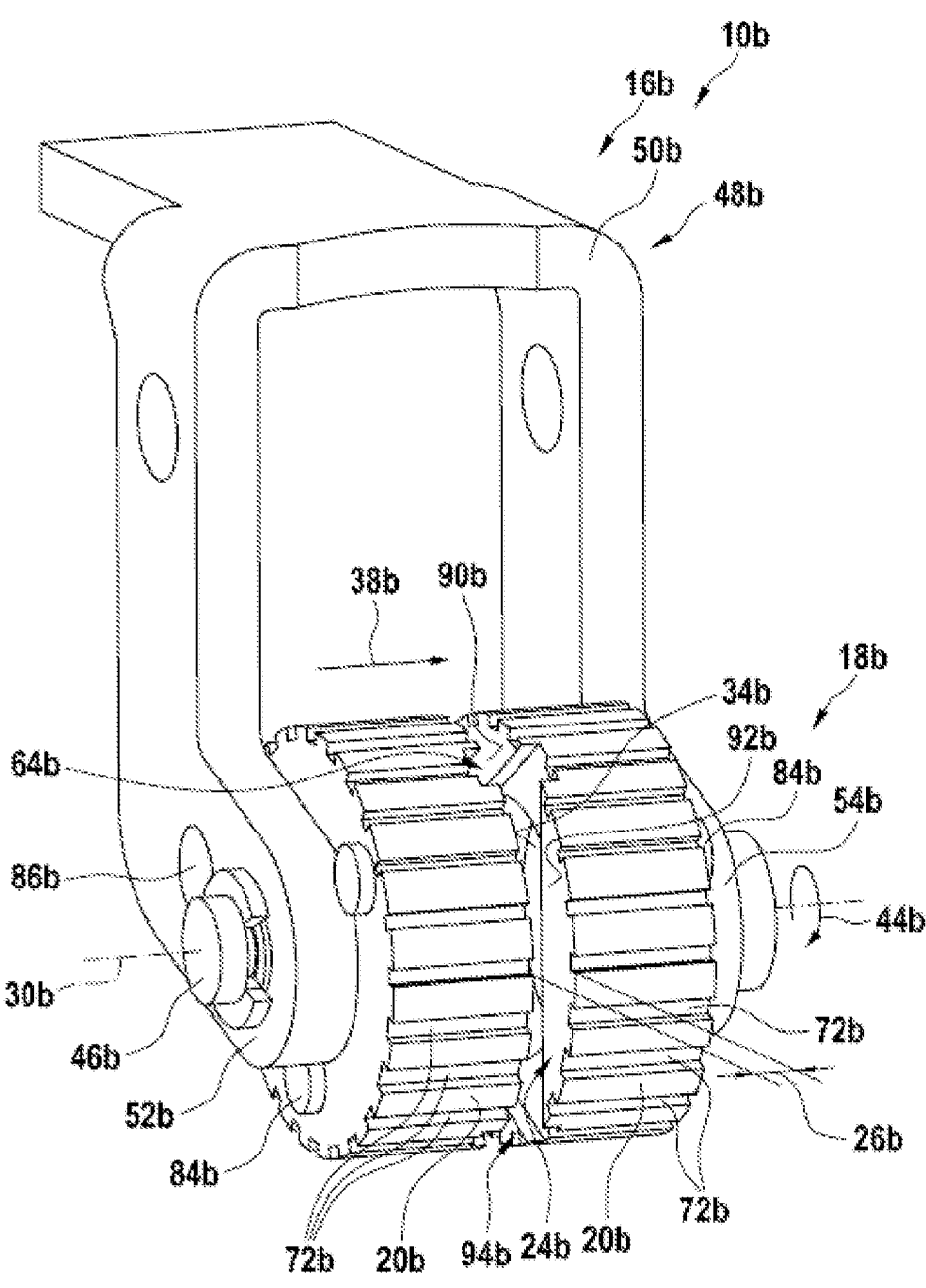
Figure 7:
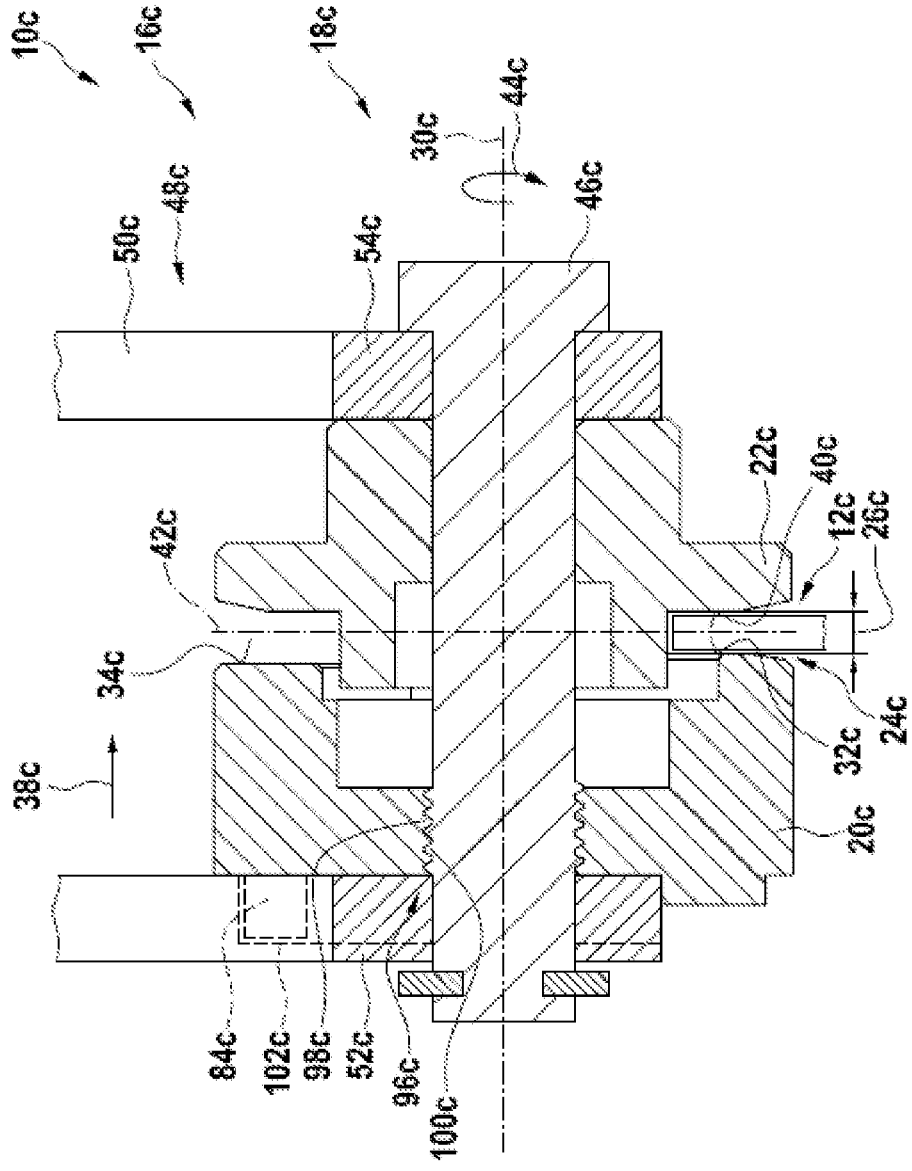

FIGS. 6 and 7 each show a further exemplary embodiment of the disclosure. The following descriptions and the drawings are essentially limited to the differences between the exemplary embodiments, whereby reference can in principle also be made with respect to identically designated components, in particular with respect to components having the same reference characters, to the drawings, and/or the description of the other exemplary embodiment, in particular FIGS. 1 to 5. In order to distinguish between the exemplary embodiments, the letter a is appended to the reference characters for the exemplary embodiment in FIGS. 1 to 5. The letter a is replaced by the letters b and c in the exemplary embodiments in FIGS. 6 and 7.

FIG. 6 shows a perspective view of an alternative embodiment of a saw blade guiding device 16*b*, which is in particular formed as part of a saw 10*b*. The saw blade guiding device 16*b* comprises a guide unit 18*b* for guiding a saw blade of the saw 10*b* (not shown in FIG. 6) in a sawing operation, whereby the guide unit 18*b* comprises two guide elements 20*b*, 22*b*, which are provided together for forming a guide holder 24*b* for the saw blade, in particular an untoothed saw blade back of the saw blade. A width 26*b* of the guide holder 24*b* is adjustable via the two guide elements 20*b*, 22*b*. One guide element 20*b* of the two guide elements 20*b*, 22*b* comprises three guide faces 32*b*, 34*b*, 36*b* on a side facing the other guide element 22*b* of the two guide elements 20*b*, 22*b* (only guide face 34*b* is shown in the drawing; see FIG. 3), each face being provided to form a side face of the guide holder 24*b*, in particular depending on a guiding position of the guide element 20*b*. The three guide faces 32*b*, 34*b*, 36*b* of the guide element 20*b* are arranged offset with respect to one another at least substantially parallel to an extent of the width 26*b* of the guide holder 24*b*. The guide element 20*b* features three guiding positions; in the three guiding positions of the guide element 20*b*, a different one of the three guide faces 32*b*, 34*b*, 36*b* of the guide element 20*b* in each case forms a side face of the guide holder 24*b*. The guide element 20*b* is designed to be rotatable about an axis of rotation 30*b* of the guide element 20*b* in order to adjust the width 26*b* of the guide holder 24*b*, whereby the three guide faces 32*b*, 34*b*, 36*b* of the guide element 20*b* are arranged offset with respect to one another in a circumferential direction 44*b* about the axis of rotation 30*b*. The embodiment of the saw blade guiding device 16*b* shown in FIG. 6 substantially corresponds to the saw blade guiding device 16*a* shown in FIGS. 1 to 5. The saw blade guiding device 16*b* shown in FIG. 6 differs from the saw blade guiding device 16*a* shown in FIGS. 1 to 5 in that the other guide element 22*b* of the guide unit 18*b* is formed separately from a holding unit 48*b* of the saw blade guiding device 16*b*, in particular a holding element 50*b* of the holding unit 48*b*. The other guide element 22*b* comprises three guide faces 90*b*, 92*b*, 94*b* on one side facing the guide element 20*b* and each provided to form another side face of the guide holder 24*b*, the three guide faces 90*b*, 92*b*, 94*b* of the other guide element 22*b* being arranged offset with respect to one another at least substantially parallel to the extent of the width 26*b* of the guide holder 24*b*. The other guide element 22*b* is designed to be coupled to the guide element 20*b* rotatably about the axis of rotation 30*b* in order to adjust the width 26*b* of the guide holder 24*b*, whereby, in the three guiding positions of the guide element 20*b* and the other guide element 22*b*, other respective guide faces 32*b*, 34*b*, 36*b*, 90*b*, 92*b*, 94*b* of the guide element 20*b* and the other respective guide element 22*b* form the guide holder 24.

Preferably, the guide element 20*b* and the other guide element 22*b* each include fixing means 84*b* for fixing the guide elements 20*b*, 22*b* relative to the holding element 50*b*, in particular to a respective bracket portion 52*b*, 54*b* of the holding element 50*b*. The guide unit 18*b* comprises a reset element 56*b* designed as a compression spring which is arranged between the guide element 20*b* and the other guide element 22*b* (not shown in FIG. 6, similar to FIG. 2). The reset element 56*b* is particularly provided to apply a reset force to the guide element 20*b* and the other guide element 22*b* that acts in opposite directions on the guide element 20*b* and on the other guide element 22*b*. In particular, the reset element 56*b* is provided to push the guide element 20*b* and the other guide element 22*b* apart, in particular onto a respective bracket portion 52*b*, 54*b* of the holding element 50*b*. Preferably, the guide element 20*b* and the other guide element 22*b* are provided to cooperate with a respective recess 86*b* delimited by the holding element 50*b* via the fixing means 84*b* in the guiding positions. In particular, the holding element 50*b* delimits two recesses 86*b* for receiving one of the fixing means 84*b*, whereby the recesses 86*b* are respectively arranged on one of the bracket portions 52*b*, 54*b* of the holding element 50*b*. One of the recesses 86*b* is particularly provided for a connection to a fixing means 84*b* arranged on the guide element 20*b*. Another of the recesses 86*b* is particularly provided for a connection to a fixing means 84*b* arranged on the other guide element 22*b*. In particular, the guide elements 20*b*, 22*b* are provided to be pressed together against the return force of the reset element 56*b* in order to adjust the width 26*b* of the guide holder 24*b*, whereby the fixing means 84*b* disengage from the recesses 86*b* and the guide element 20*b* and the other guide element 22*b* are rotatable about the axis of rotation 30*b*. Preferably, the guide unit 18*b* comprises a coupling element (not shown in the drawings) designed as a pin for coupling the two guide elements 20*b*, 22*b* when rotated about the axis of rotation 30*b*. In particular, the coupling element extends at least substantially parallel to the axis of rotation 30*b*. Preferably, the coupling element is arranged between the two guide elements 20*b*, 22*b*. The guide element 20*b* and the other guide element 22*b* have an at least substantially identical cylindrical basic shape. The other guide element 22*b*, like the guide element 20*b*, comprises actuating means 72*b* (see FIG. 3).

In FIG. 7, a schematic sectional view of a further alternative embodiment of a saw blade guiding device 16*c* is shown, in particular whereby a sectional plane includes an axis of rotation 30*c* of a guide element 20*c* of a guide unit 18*c* of the saw blade guiding device 16*c*. The saw blade guiding device 16*c* is designed as part of a saw 10*c*. The saw blade guiding device 16*c* comprises the guide unit 18*c* for guiding a saw blade of the saw 10*c* (not shown in FIG. 7) during a sawing operation, whereby the guide unit 18*c* comprises two guide elements 20*c*, 22*c* which are provided to together form a guide holder 24*c* for the saw blade, in particular an untoothed saw blade back. A width 26*c* of the guide holder 24*c* is adjustable via the two guide elements 20*c*, 22*c*. The guide element 20*c* of the two guide elements 20*c*, 22*c* comprises a plurality of guide faces 32*c*, 34*c* on a side facing the other guide element 22*c* of the two guide elements 20*c*, 22*c*, each of the guide faces being provided to form a side face of the guide holder 24*c*, in particular depending on a guiding position of the guide element 20*c*. The guide faces 32*c*, 34*c* of the guide element 20*c* are arranged offset with respect to one another at least substantially parallel to an extent of the width 26*c* of the guide holder 24*c*. The guide element 20*c* features a plurality of guiding positions, whereby in each of the guiding positions of the guide element 20*c*, a different one of the guide faces 32*c*, 34*c* of the guide element 20*c* forms a side face of the guide holder 24*c*. The guide element 20*c* is designed to be rotatable about the axis of rotation 30*c* of the guide element 20*c* in order to adjust the width 26*c* of the guide holder 24*c*. The embodiment of the saw blade guiding device 16*c* shown in FIG. 7 substantially corresponds to the saw blade guiding device 16*a* shown in FIGS. 1 to 5. The saw blade guiding device 16*c* shown in FIG. 7 differs from the saw blade guiding device 16*a* shown in FIGS. 1 to 5 in that the guide unit 18*c* comprises a screw thread 96*c* for moving the guide element 20*c* along the axis of rotation 30*c* in order to adjust the width 26*c* of the guide holder 24*c*. The guide element 20*c* forms an inner thread 98*c* for the screw thread 96*c* on an inside facing the axis of rotation 30*c*. A bearing element 46*c* of the guide unit 18*c*, about which the guide element 20*c* in particular is rotatable, forms an outer thread 100*c* of the screw thread 96*c* on an outer side facing the guide element 20*c*, the outer thread in particular being designed to correspond to the inner thread 98*c*. The guide element 20*c* is provided to be moved along the bearing element 46*c* at least substantially parallel to the axis of rotation 30*c* via the screw thread 96*c* in order to adjust the width 26*c* of the guide holder 24*c* by means of the guide faces 32*c*, 34*c*, in particular whereby another of the guide faces 32*c*, 34*c* of the guide element 20*c* is in each case arranged in a region of the guide holder 24*c*. It is conceivable that the guide faces 32*c*, 34*c* are each formed oblique to a plane extending perpendicular to the axis of rotation 30*c*, in particular a central plane 42*c* of the guide holder 24*c*. In particular, it is conceivable that the obliquely formed guide faces 32*c*, 34*c* are arranged flush with each other along a circumferential direction 44*c* about the axis of rotation 30*c*, and preferably form a common guide face 32*c*, 34*c* that extends spirally about the axis of rotation 30*c*. By means of the obliquely formed guide faces 32*c*, 34*c*, an advantageously continuous, in particular continuously variable, adjustment of the width 26*c* of the guide holder 24*c* can be made possible upon rotation of the guide element 20*c* about the axis of rotation 30*c*. The guide element 20*c* forms a fixing means 84*c* which is arranged as a projection on an outside of the guide element 20*c* facing away from the side comprising the guide faces 32*c*, 34*c*. In particular, a holding element 50*c* of a holding unit 48*c* of the saw blade guiding device 16*c* delimits at least one stop 102*c* for cooperating with the fixing means 84*c* in at least one position of the guide element 20*c*, in particular one guiding position. Other embodiments of the guide unit 18*c*, in particular of the screw thread 96*c*, the guide element 20*c*, and/or the fixing means 84*c* are also conceivable. For example, it is conceivable that the guide unit 18*c* comprise a fixing means 84*c* or a plurality of fixing means 84*c* for fixing the guide element 20*c* in a position about the axis of rotation 30*c* independent of a specified guiding position, e.g. by means of clamping and/or via a spring-loaded and/or fixable, frictional connection between the holding element 50*c* and the guide element 20*c*.

The invention claimed is:

1. A saw blade guiding device for a saw, comprising:
   at least one guide unit configured to guide a saw blade of the saw in a sawing operation, the at least one guide unit comprising two guide elements, which together form a guide holder for the saw blade, the guide holder having a width that is adjustable by the two guide elements,
   wherein at least one guide element of the two guide elements has, on a side facing the other guide element of the two guide elements, at least two guide faces, each of which is configured to, depending on a guiding position of the guide element, form a side face of the guide holder, and wherein the at least two guide faces of the guide element are arranged offset with respect to one another at least substantially parallel to an extent of the width of the guide holder.

2. The saw blade guiding device according to claim 1, wherein:

the at least one guide element is movably mounted such that movement of the at least one guide elements adjusts the width of the guide holder and the at least one guide element has at least two guiding positions and, in a first guiding position of the at least two guiding positions, a first guide face of the at least two guide faces forms the side face of the guide holder and, in a second guiding position of the at least two guiding positions, a second guide face of the at least two guide faces forms the side face of the guide holder.

3. The saw blade guiding device according to claim 2, wherein:

in order to adjust the width of the guide holder, the guide element is rotatable about an axis of rotation of the guide element, and the at least two guide faces of the guide element are arranged offset in a circumferential direction with respect to one another about the axis of rotation.

4. The saw blade guiding device according to claim 2, further comprising:

at least one holding unit, which is at least substantially fixed to a housing in order to retain the at least one guide unit, wherein the at least one guide unit comprises at least one fixing structure, wherein the at least one guide element is movably mounted relative to the at least one holding unit in order to adjust the width of the guide holder, and wherein the at least one fixing structure is configured to fix the at least one guide element in at least one of the at least two guiding positions relative to the holding unit.

5. The saw blade guiding device according to claim 4, wherein:

the at least one fixing structure includes a plurality of fixing structures arranged on the at least one guide element, and individual fixing structures of the plurality of fixing structures are configured to fix the guide element to the at least one holding unit in one of the at least two guiding positions in a frictional and/or interlocking manner.

6. The saw blade guiding device according to claim 2, wherein the at least one guide unit comprises at least one reset element configured to counteract movement of the at least one guide element from one of the at least two guiding positions.

7. The saw blade guiding device according to claim 2, wherein the other guide element comprises at least two further guide faces on a side facing the at least one guide element, each of the two further guide faces forming another side face of the guide holder, and the at least two further guide faces of the other guide element are arranged offset with respect to one another at least substantially parallel to the extent of the width of the guide holder.

8. The saw blade guiding device according to claim 7, wherein:

the other guide element is designed configured to be movably coupled to the at least one guide element to adjust the width of the guide holder, and in the at least two guiding positions of the guide element and the other guide element, other respective guide faces of the guide element and the other guide element form the guide holder.

9. The saw blade guiding device according to claim 3, wherein:

the at least two guide faces comprises three guide faces, each of which is configured to form the side face of the guide holder, the three guide faces are arranged offset with respect to one another at least substantially parallel to the extent of the width of the guide holder, the three guide faces are arranged at a regular distance distributed about the axis of rotation, and the three guide faces each extend over an angular range of at least 90° about the axis of rotation.

10. A jig saw, comprising:

at least one saw blade guiding device comprising:

at least one guide unit configured to guide a saw blade of the saw in a sawing operation, the at least one guide unit comprising two guide elements, which together form a guide holder for the saw blade, the guide holder having a width that is adjustable by the two guide elements, wherein at least one guide element of the two guide elements has, on a side facing the other guide element of the two guide elements, at least two guide faces, each of which is configured to, depending on a guiding position of the guide element, form a side face of the guide holder, and wherein the at least two guide faces of the guide element are arranged offset with respect to one another at least substantially parallel to an extent of the width of the guide holder.

11. The saw blade guiding device according to claim 1, wherein the saw blade guiding device is configured for a jigsaw.

12. The saw blade guiding device according to claim 1, wherein the guide holder is configured to guide an untoothed saw blade back.

13. The saw blade guiding device according to claim 1, wherein the guide holder is configured to guide an untoothed saw blade back.

14. The saw blade guiding device according to claim 8, wherein the other guide element is movably coupled to the at least one guide element in a rotatable manner about an axis of rotation.

* * * * *